March 18, 1924.
A. PARSONS
AUTOMATIC SCALE INDICATOR
Filed Oct. 24, 1921
1,487,120
2 Sheets-Sheet 2
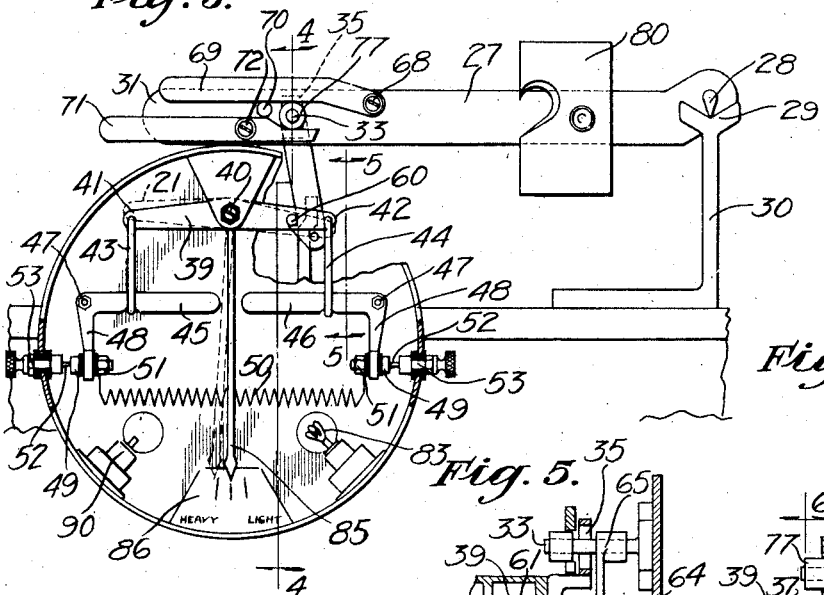
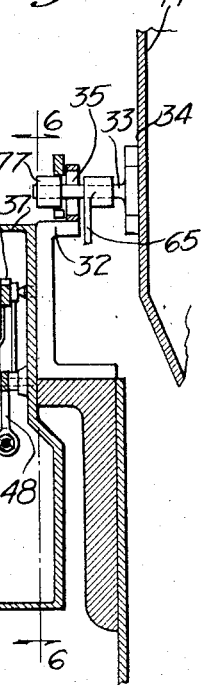
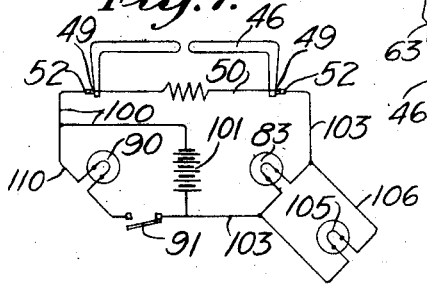
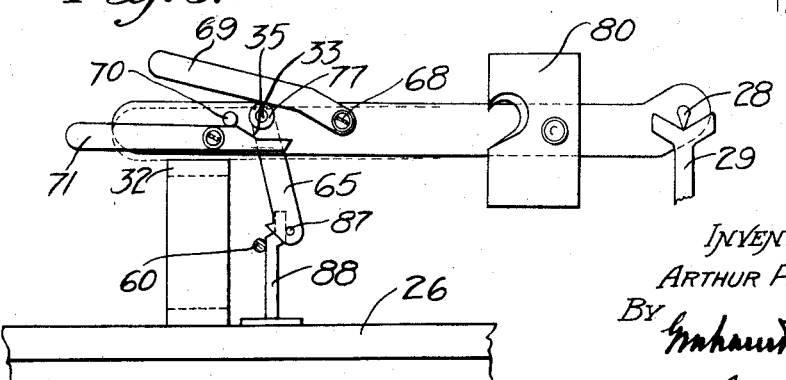
INVENTOR:
ARTHUR PARSONS,
BY
ATTORNEYS Patented Mar. 18, 1924.

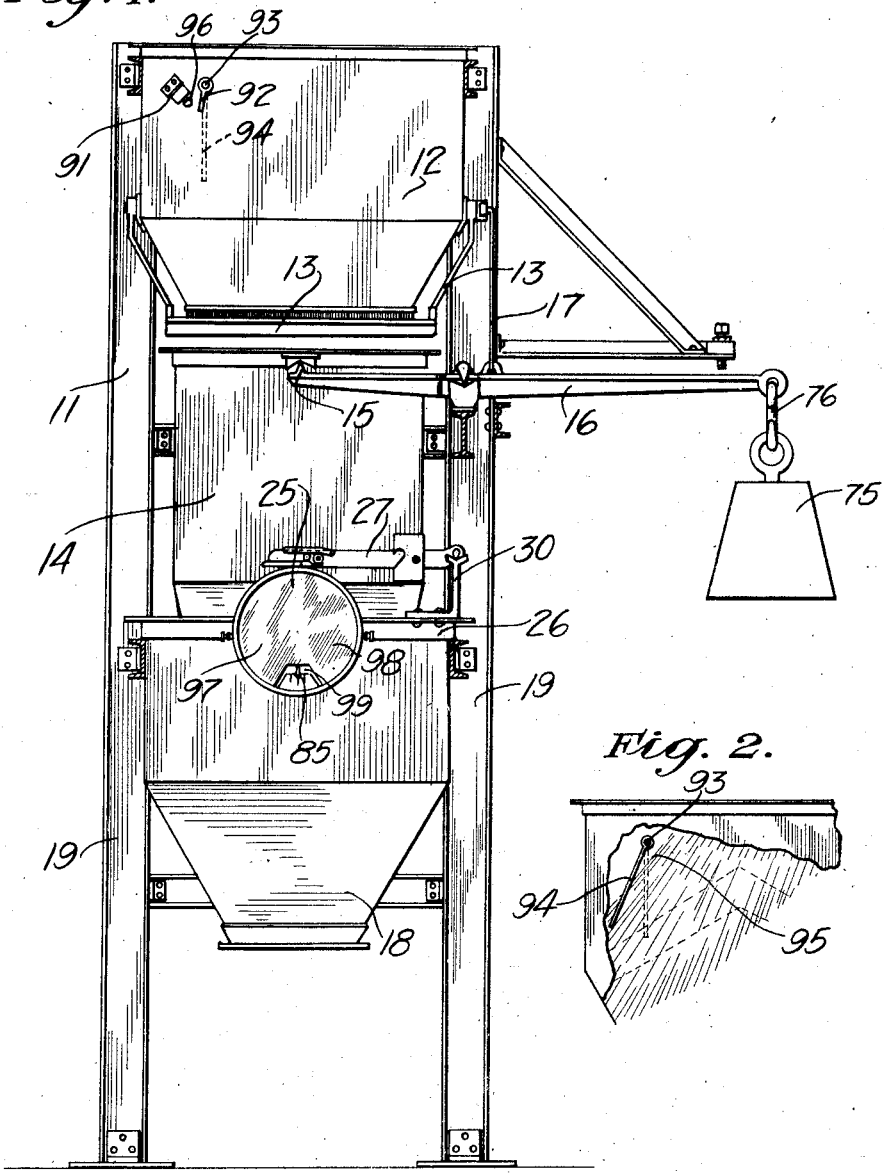

1,487,120

UNITED STATES PATENT OFFICE.

ARTHUR PARSONS, OF PASADENA, CALIFORNIA.

AUTOMATIC SCALE INDICATOR.

Application filed October 24, 1921. Serial No. 509,992.

*To all whom it may concern:*

Be it known that I, ARTHUR PARSONS, a subject of the King of England, residing at Pasadena, county of Los Angeles, and State of California, have invented a new and useful Automatic Scale Indicator, of which the following is a specification.

This invention relates to equipment for automatic weighing apparatus and more particularly to a device for indicating to an operator the accuracy of the separate weighings performed by the apparatus.

In the operation of automatic weighing machines, a variation in the accuracy of the different weighings performed may be encountered due to the unsteadiness of flow from the feed hopper of the materials being weighed. This change in flow of the materials is imperceptible unless each separate weighing is carefully noted by the operator and as the result thereof a considerable number of weighings not coming within the allowable inaccuracy limits may be performed.

It is an object of my invention to provide a device for use upon weighing machines of this type which will provide at each weighing a sensible indication as to whether or not the weighing is accurate within certain pre-determined limits of variation, this indication being preferably in the form of a light which will be illuminated when the scale elements of the weighing machine are in a condition of balance.

It is also an object of my invention to provide in such a device a means for indicating to the operator that the material contained in the feed hopper of the weighing machine is depleted to a predetermined low point.

It is a further object of my invention to provide means of compensating for an allowable variation in accuracy above or below the weight at which the apparatus is set to give a perfect balance of the weigh beam.

Other objects and advantages will be made evident hereinafter.

Referring to the drawings which are for illustrative purposes only:

Fig. 1 is an elevational view showing my invention in use upon an automatic scale.

Fig. 2 is a fragmentary view of the feed hopper of the automatic scale shown in Fig. 1, a portion of the front plate of the feed hopper being removed to illustrate the feed level indicating device I employ.

Fig. 3 is an enlarged view of my invention with the cover thereof removed to disclose the interior mechanism, and a portion of the casing being cut away to disclose mechanism situated in the rear thereof.

Fig. 4 is a sectional view through my device taken substantially upon a plane represented by the line 4—4 of Fig. 3.

Fig. 5 is a fragmentary section taken substantially upon a plane represented by the line 5—5 of Fig. 3.

Fig. 6 is a detail view taken as indicated by the line 6—6 of Fig. 4, this detail showing the compensating arm of my device disposed in raised position.

Fig. 7 is a diagram of the electrical connections I employ with my device.

The weighing apparatus 11 employed in the drawings to illustrate the utility of my invention, is shown in a somewhat diagrammatic form and comprises essentially a feed hopper 12, the flow of material from which is controlled by gate mechanism 13; a weigh hopper 14 suspended below the feed hopper from knives 15 of a weigh beam 16 controlling the operation of gate 13 through interconnecting mechanism 17; and a receiving hopper 18 into which the weighed material is dumped from the weigh hopper 14; these scale members being suitably supported by framework 19.

It is the essential feature of my invention to provide an indicating mechanism 25 which may be mounted upon some stationary portion of the apparatus, such as the angle rim 26 of the receiving hopper 18, this indicator 25 being in engagement with one of the balance elements of the scale, preferably the weigh hopper 14. The indicator 25 consists as shown in Fig. 3, of a compensating arm 27 pivoted upon the knives 28 resting in grooved heads 29 of a supporting bracket 30, the swinging end 31 of the compensating arm 27 being adapted to rest upon a lug 32 when the balance elements of the scale are disposed in a position of balance so that a pin 33 mounted upon the front face 34 of the weighing hopper 14 extends approximately centrally through a slot 35 in the arm 27. The lug 32 projects inwardly from a bracket 38 which also supports a casing member in which an arm 39 is centrally pivoted upon trunnion screws, as shown at 40. Suspended from the ends 41 and 42 of the arm 39 are links 43 and 44 extending under arms 45 and 46 which are pivoted upon pins 47 and have downwardly extended therefrom arms 48 through which contact members 49 are insulated, these contact members 49 being flexibly connected by a conductor 50 extended between the nuts 51 of the members 49. The contact members 49 are normally held against contact points 52 due to the weight of the arms 45 and 46, these contact points 52 may be suitably supported upon binding posts 53 insulated through the casing 37. Extending rearwardly from the end 42 of the arm 39 I employ a pin 60 which extends through an opening 61 in the casing 37, the opening 61 being guarded against the entrance of dust by a flexible corrugated tubular member 62 which extends between a ring 63 upon the casing 37 and a circular plate 64 mounted upon the pin 60. This pin 60 is engageable by a hooked arm 65 suspended from the pin 33 mounted upon the weigh hopper 14.

Upon the compensating arm 27 I pivot at 68 an arm 69 which rests against a pin 70 extended from the compensating arm 27 when the pin 33 is disposed centrally within the slot 35. An arm 71 is pivoted at 72 upon the compensating arm 27 and the inner end thereof also rests against the pin 70 when the pin 33 is in the above noted central position. The before mentioned central position of the pin 33 exists only when the scale elements are in perfect balance. When the weight 75 is suspended from the weight hook 76 of the scale beam 16 the weigh hopper 14 is lifted carrying the pin 33 to the position shown in Fig. 6. As the pin 33 travels upward a collar 77 mounted upon the end thereof lifts the arm 69 and as it further moves upward comes in contact with the upper side of the slot 35 and lifts the compensating arm 27 from the lug 32 so that the weight of the compensating arm is then applied through the pin 33 to the weigh hopper 14. The compensating arm 27 is furnished with a slidable weight 80 so that the downward force exerted through the pin 33 to the hopper 14 may be adjusted to compensate for the weight of the suspended material at the time the gate 13 is closed through the mechanism 17 by the downward movement of the hopper 14. It will be perceived that the arm 27 is raised only slightly from the support 32 and that the compensating weight is applied to the hopper 14 only during the initial part of the downward movement of the hopper 14 so that approximately co-incident with the closing of the gate controlling the flow of material into the hopper 14 the arm 27 is received upon the support 32 thus having no effect upon the balance of the scale beam after its application. When the amount of materials allowed to pass by the gate 13 into the hopper 14 are sufficient to attain a balance of the scale elements and the hopper starts downward, the inertia in the downwardly moving mass carries the hopper and its associated elements beyond the point of balance to a position where the inertia thereof is overcome by a dashpot, not shown, which is provided in the construction of such weighing apparatus to control the rapidity of movement of the balance elements and whereupon the hopper then travels upward seeking a point of balance.

Due to the weight of the pin 60 the arm 39 assumes a sloping position somewhat as indicated by the dotted lines 21 in Fig. 3, and the arm 45 is held in raised position withdrawing the member 49 out of contact with the pin 52. In the lowest position of the hopper 14 the hooked arm 65 engages the pin 60 and as the hook arm 65 is carried upwardly with the return of the hopper 14 the end 42 of the arm 39 is carried to the position illustrated in full lines in Fig. 3, in which position the links 43 and 44 do not engage the arms 45 and 46 thus both the sets of contacts 49 and 52 are allowed to remain in a closed position which provides an open circuit for the energization of an indicating means such as the incandescent light 83. If the weighing is heavy the hopper 14 does not return to the point of balance and likewise does not lift the end 42 of the arm 39 sufficiently to cause a lowering of the link 43 that will allow the contact member thereof to connect, and as a result thereof no current flows through the circuit and the indicating means 83 remains inactive denoting that the weighing is inaccurate. Likewise, if the material in the hopper is underweight the hopper will return upwardly beyond the point of balance and the end 42 of the arm 39 will be raised beyond the position shown in full lines in Fig. 3, and the link 44 will raise the arm 46 causing the opening of the contacts 49 and 52 associated therewith, with the result that the indicating means 83 remains also inactive, thereby indicating an inaccuracy of the weighing. Whether the inaccurate weighing is light or heavy may be determined by reference to a pointer 85 suspended centrally from the arm 39 and indicating upon a suitable scale 86 the necessary information. A pin 87 extending inwardly from the hook arm 65 operates along a cam member 88 mounted upon the angle 26 which cam is so formed that it forces the hook arm 65 out of engagement with the pin 60 when the arm is raised above a certain position such as occurs when the weigh hopper is discharged and assumes its highest position preliminary to another weighing operation.

The arms 69 and 71 are adapted to resist the movement of the pin 33 upwardly or downwardly with a force equal to the allowable variation in the accuracy of the weighings. It will be noticed in the raised position of the compensating arm 27, as shown in Fig. 6, that the arm 69 is lifted from the pin 70 and that its weight is downwardly exerted upon the pin 33 which transfers the force thereof to the hopper so that in event the material in the weigh hopper is slightly less than the correct weight at which the scale is set and the hopper comes to balance rest slightly above the central position the weight of the arm 69 is exerted in bringing the hopper to the position of correct weight thus compensating for the allowable variation in the weight. Also if the weighing is slightly heavy the arm 71 will exert an upward force upon the pin 33. Within the casing 37 I also mount an incandescent light 90 in circuit with a switch 91 mounted upon the feed hopper 12, this switch being adapted to actuation by an arm 92 mounted upon a shaft 93 which extends within the hopper 12 and has hanging therefrom a vane 94 rigidly connected with the shaft 93 so that the shaft 93 will be partially rotated by the lateral movement of the free end of the vane 94. When the hopper 12 is empty the weight of the vane 94 maintains it in a vertical position, as indicated in Fig. 1, and when materials to be weighed are poured into the hopper 12 the rising level 95 of the materials engages the vane 94 and causes its movement into the position shown in full lines, in Fig. 2, whereupon the arm 92 exteriorly mounted upon the shaft 93 is brought against an actuating button 96 of the switch 91 and a circuit is closed causing the illumination of the red light 90. Whenever the amount of material within the feed hopper recedes below the level at which it encounters the vane 94 the circuit having therein the light 90 will be opened and the light 90 will cease to be illuminated thus indicating that the materials within the hopper 12 are at a low level. I provide a glass face 97 for the casing 37 having the greater portion 98 thereof frosted to temper the intensity of the light from the globes 83—90 only a small portion of the glass being left unfrosted and as indicated at 99 to permit a view of the lower end of the pointer and the dial 86.

As shown in the wiring diagram Fig. 7, the circuit in which the light 83 is located comprises a conductor 100 connecting between an electric current source 101 and one of the contacts 52, the flexible conductor 50 extended between the contacts 49, and a return conductor 103 in which the light is situated. It is sometimes desirable to provide a remotely located indicator for the reference of the weighroom superintendent, which indicator may consist of a light 105 located in a shunt circuit 106 so as to be actuable with the light 83. The circuit 110 having therein the light 90 and the switch 91 may be taken off from the conductors 100 and 103.

I claim as my invention:

1. In combination with the balance elements of a scale; an indicator arm; a member, mounted upon one of the balance elements of said scale, adapted to engage said indicator arm near the end of the forward movement of said balance element, and to carry said indicator rearwardly as the said balance element makes its return movement; means for sensibly indicating the position of said indicator arm; and means for disengaging said member from said indicator arm when said balance element has returned to its initial position.

2. In combination with the balance elements of a scale; an indicator arm; a member, mounted upon one of the balance elements of said scale, adapted to engage said indicator arm near the end of the forward movement of said balance element, and to carry said indicator rearwardly as the said balance element makes its return movement; means for disengaging said indicator arm; and means for sensibly indicating the position of said indicator arm.

3. In combination with the balance elements of a scale: an indicator arm; a member mounted upon one of the balance elements of said scale, said member having a hooked engager adapted, at a point near the end of the forward movement of said balance element, to engage said arm and to carry said arm rearwardly upon the return movement of said balance element; means for sensibly indicating the position of said indicator arm; means for releasing said engager from said indicator arm; and a compensating arm so placed as to be slightly raised by said member when said balance element is in its initial position.

4. In combination with the balance elements of a scale; an indicator arm; a member mounted upon one of the balance elements of said scale, said member having a hooked engager adapted, at a point near the end of the forward movement of said balance element, to engage said arm and to carry said arm rearwardly upon the return movement of said balance element; means for sensibly indicating the position of said indicator arm; means for releasing said engager from said indicator arm; a compensating arm so placed as to be slightly raised by said member when said balance element is in its initial position; and allowable variation members placed on each side of said member, for exerting upon said member a static force, substantially equal to the allowable variation in each weighing, when said balance element is to either side of the position of balance.

5. In an indicator for scales, the combination of: a centrally pivoted arm; a switch adapted to be actuated when one end of said arm is raised; a second switch adapted to be actuated when the other end of said arm is raised; an electrically operated indicator in series with said switches; and means associable with said arm and the balance elements of a scale whereby the movement of said elements will cause a corresponding movement in said arm.

6. In an indicator for scales, the combination of: a swingable arm; an engager mounted upon one of the balance elements of a scale adapted to engage said arm, thereby causing said arm to move with said balance elements; a pointer operated by said arm to indicate the relative position of said arm upon a calibrated scale; electrically operated indicating means; and switch means actuated by said arm to permit the energization of said indicating means when said elements are in balance.

7. In an indicator for scales, the combination of: a casing; a centrally pivoted arm mounted in said casing; a switch in said casing adapted to be opened when one end of said arm is raised; a second switch in said casing adapted to be opened when the other end of said arm is raised; an electrically operated indicator is series with said switches; and means associable with said arm and the balance elements of a scale whereby the movement of said elements will cause a corresponding movement in said arm.

8. In an indicator for scales, the combination of: a compensating lever; a pin movable with the balance elements of a scale, said pin extending through said compensating lever; a casing providing a lug upon which said lever rests when not raised by said pin; a centrally pivoted arm mounted in said casing; a projection upon said arm extending through said casing; an engager supported by said pin, said engager engaging said projection in position to one side of the center of balance of said elements and to cause the movement thereof in an upward direction as said elements move into the position of balance; an electrically operated indicator in series with a pair of switches; mechanism operating between one of said switches and one end of said arm whereby said switch is opened by the raising of said end of said arm; mechanism operating between the other of said switches and the opposite end of said arm whereby said other switch is opened by the raising of said opposite end of said arm; substantially as described 9. In an indicator for scales, the combination of: a compensating lever having a slot therein; a pin projecting from one of the balance elements of a scale; said pin extending through said slot in said compensating lever; means associated with said compensating lever exerting a downward force upon said pin when said pin is in a position above the center of said slot; means associated with said compensating lever exerting an upward force against said pin when said pin is in a position below the center of said slot; a casing providing a lug upon which said lever rests when not raised by said pin; a centrally pivoted arm mounted in said casing; a projection upon said arm extending through said casing; an engager supported by said pin, said engager engaging said projection in position to one side of the center of balance of said elements and to cause the movement thereof in an upward direction as said elements move into the position of balance; an electrically operated indicator in series with a pair of switches; mechanism operating between one of said switches and one end of said arm whereby said switch is opened by the raising of said end of said arm; mechanism operating between the other of said switches and the opposite end of said arm whereby said other switch is opened by the raising of said opposite end of said arm; substantially as described.

10. In an indicator for scales, the combination of: a compensating lever having a slot therein; a pin projecting from one of the balance elements of a scale; said pin extending through said slot in said compensating lever; a bar pivoted upon said compensating lever exerting a downward force upon said pin when said pin is in a position above the center of said slot; a bar pivoted upon said compensating lever exerting an upward force against said pin when said pin is in a position below the center of said slot; a casing providing a lug upon which said lever rests when not raised by said pin; a centrally pivoted arm mounted in said casing; a projection upon said arm extending through said casing; an engager supported by said pin, said engager engaging said projection in position to one side of the center of balance of said elements and to cause the movement thereof in an upward direction as said elements move into the position of balance; an electrically operated indicator in series with a pair of switches; mechanism operating between one of said switches and one end of said arm whereby said switch is opened by the raising of said end of said arm; mechanism operating between the other of said switches and the opposite end of said arm whereby said other switch is opened by the raising of said opposite end of said arm; substantially as described.

11. In an indicating mechanism for automatic scales, the combination of: a compensating lever having a slot therein; a pin projecting from one of the balance elements of a scale; said pin extending through said slot in said compensating lever; a bar pivoted upon said compensating lever exerting a downward force upon said pin when said pin is in a position above the center of said slot; a bar pivoted upon said compensating lever exerting an upward force against said pin when said pin is in a position below the center of said slot; a casing providing a lug upon which said lever rests when not raised by said pin; a centrally pivoted arm mounted in said casing; a projection upon said arm extending through said casing; an engager supported by said pin, said engager engaging said projection in position to one side of the center of balance of said elements and to cause the movement thereof in an upward direction as said elements move into the position of balance; an electrically operated indicator in series with a pair of switches; mechanism operating between one of said switches and one end of said arm whereby said switch is opened by the raising of said end of said arm; mechanism operating between the other of said switches and the opposite end of said arm whereby said other switch is opened by the raising of said opposite end of said arm; a second electrically operated indicating means in said casing; a switch in circuit with said second indicating means; and level actuated means in the feed hopper of said scale for operating said lastly named switch.

In testimony whereof, I have hereunto set my hand at Los Angeles, California, this 17th day of October, 1921.

ARTHUR PARSONS.